United States Patent
Potdar et al.

(10) Patent No.: US 8,798,140 B2
(45) Date of Patent: Aug. 5, 2014

(54) ENCODING VIDEO FRAMES IN A VIDEO ENCODER

(75) Inventors: Mandar Anil Potdar, Pune (IN); Soumen Kumar Dey, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 575 days.

(21) Appl. No.: 12/360,120

(22) Filed: Jan. 27, 2009

(65) Prior Publication Data

US 2010/0189174 A1   Jul. 29, 2010

(51) Int. Cl.
*H04M 7/12* (2006.01)

(52) U.S. Cl.
USPC ............. 375/240.03; 375/240.18; 375/240.24

(58) Field of Classification Search
None
See application file for complete search history.

(56) References Cited

U.S. PATENT DOCUMENTS

| | | | | |
|---|---|---|---|---|
| 2008/0137738 A1* | 6/2008 | Fernandes | ................ | 375/240.03 |
| 2009/0016433 A1* | 1/2009 | Henocq et al. | ........... | 375/240.01 |
| 2009/0110081 A1* | 4/2009 | Boice et al. | .............. | 375/240.26 |

OTHER PUBLICATIONS

"Understanding Rate Control", "IndigoVision Ltd.", Dated: Jul. 2, 2008, pp. 1-19.
"Understanding Frame Rate","IndigoVision Ltd.", Dated: Sep. 24, 2003, pp. 1-10.
"Understanding MPEG-4 Video","IndigoVision Ltd.", Dated: Jun. 11, 2008, pp. 1-14.
"Understanding H.264 Video","IndigoVision Ltd.", Dated: Nov. 20, 2006, pp. 1-15.

* cited by examiner

*Primary Examiner* — Jutai Kao

(57) ABSTRACT

An encoder provided according to an aspect of the present invention uses an approach which seeks to limit the number of bits in each of a sequence of video frames to a same upper limit. By providing such a restriction, additional budget (i.e., more number of bits that can be used for the encoded bits for the frame) may be available for encoding of later received frames in the sequence, thereby avoiding quality degradation with respect to reproduction of such later frames. According to another aspect of the present invention, a quantization parameter used during encoding is controlled to enforce such a limit. According to one more aspect of the present invention, a quantization parameter is generated for a video frame by examining content corresponding to the same video frame.

7 Claims, 10 Drawing Sheets

| QP | Bits/MB | | |
|---|---|---|---|
| | <= QCIF | <= CIF | > CIF (VGA, D1, etc) |
| 1 | 1276 | 1165 | 1276 |
| 2 | 820 | 717 | 820 |
| 3 | 604 | 518 | 604 |
| 4 | 495 | 409 | 495 |
| 5 | 419 | 337 | 419 |
| 6 | 364 | 286 | 365 |
| 7 | 321 | 248 | 322 |
| 8 | 288 | 219 | 290 |
| 9 | 262 | 196 | 264 |
| 10 | 239 | 177 | 242 |
| 11 | 221 | 162 | 224 |
| 12 | 204 | 149 | 208 |
| 13 | 190 | 138 | 195 |
| 14 | 178 | 128 | 183 |
| 15 | 167 | 120 | 172 |
| 16 | 158 | 112 | 163 |
| 17 | 149 | 106 | 154 |
| 18 | 141 | 100 | 146 |
| 19 | 134 | 95 | 139 |
| 20 | 128 | 91 | 133 |
| 21 | 122 | 87 | 127 |
| 22 | 117 | 83 | 121 |
| 23 | 112 | 79 | 116 |
| 24 | 107 | 76 | 112 |
| 25 | 103 | 73 | 107 |
| 26 | 99 | 70 | 103 |
| 27 | 95 | 67 | 99 |
| 28 | 92 | 65 | 96 |
| 29 | 88 | 63 | 93 |
| 30 | 86 | 61 | 90 |
| 31 | 83 | 59 | 87 |

FIG. 7

ENCODING VIDEO FRAMES IN A VIDEO ENCODER

BACKGROUND

1. Technical Field

The present disclosure relates to video encoders and more specifically to encoding of video frames in such encoders.

2. Related Art

A video encoder encodes (source) video frames into a suitable format for transmission, storage, etc. Each video frame contains a number of pixel values and encoding typically entails transformation of the pixel values into different values for a corresponding purpose (e.g., compression, security, etc.). A decoder thereafter processes the encoded values to recover the source video frames within an acceptable quality level, as is well known in the relevant arts.

In general, the encoding approach determines the specific values forming the encoded frame. When the encoded values are transmitted following the encoding, the encoding approach often further manifests in the timing (e.g., by virtue of frame/bit rates, etc.) of transmission of the values.

The encoding approach may need to meet the specific requirements presented by corresponding environments.

BRIEF DESCRIPTION OF THE DRAWINGS

The present invention will be described with reference to the accompanying drawings briefly described below.

FIG. 7 is a table illustrating the relationship between target bits per macroblock and required QP value for an example video sequence.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
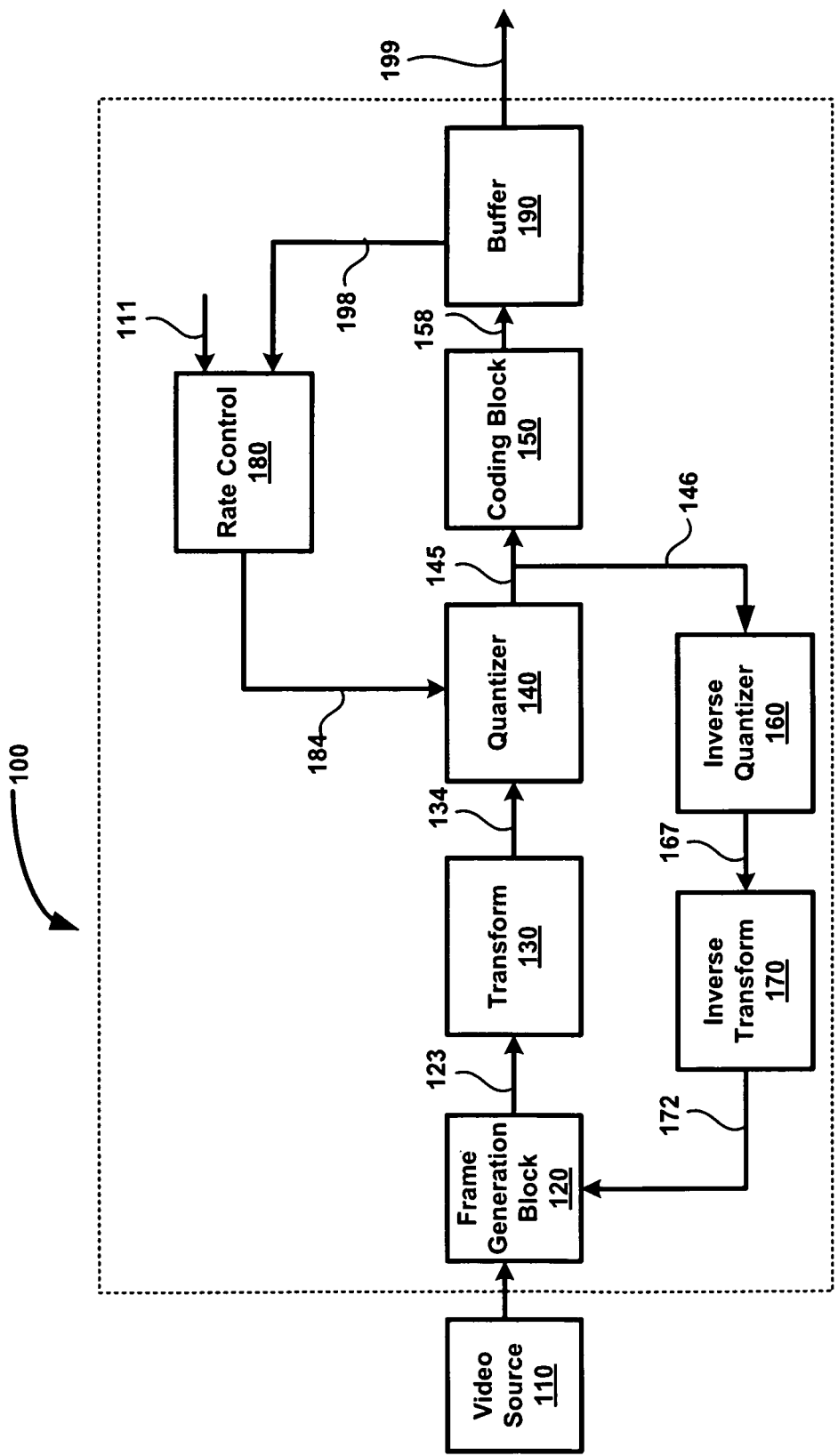
FIG. 1 is a block diagram illustrating the details of an example environment in which several aspects of the present invention can be implemented.

An encoder provided according to an aspect of the present invention uses an approach which seeks to limit the number of bits in each of a sequence of video frames to a same upper limit. Thus the number of bits in each frame would generally be less than or equal to the upper limit. By providing such a restriction, additional budget (i.e., more number of bits that can be used for the encoded bits for the frame) may be available for encoding of later received frames in the sequence, thereby avoiding quality degradation with respect to reproduction of such later frames. In an embodiment, the limit is set to three times the average bit rate at which the encoded frames are to be delivered.

According to another aspect of the present invention, a quantization parameter used during encoding, is computed using the upper limit as an input and thus the upper limit is sought to be controlled to enforce the corresponding limit. A larger value is provided when the number of bits is sought to be maintained is low and smaller value otherwise.

In one embodiment, a sequence of difference frames representing the difference of each video frame from a corresponding reference frame is generated, and coefficients representing the difference frames are generated. The coefficients are quantized according to the quantization parameter generated for each video frame. The quantized coefficients may then be coded as a sequence of code words, which form the encoded data.

According to one more aspect of the present invention, a quantization parameter is generated for a video frame by examining the content of the same video frame. In an embodiment, the corresponding difference frame is examined to determine the complexity of the frame. The complexity and upper limit are used is generating the value of the quantization parameter used for the frame.

In one embodiment, the complexity is measured as the average of variances in each of the macro-blocks. The variance of each macroblock is based on a difference of individual pixel values in the macro-block and the average of the pixel values in the macroblock.

In an alternative embodiment, to reduce the computational complexity (compared to the above noted approach based on measuring average of variances), the complexity is measured based on the resolution of the video frames. As the measure may not be accurate, the quantization parameter is further limited to not exceed a value that would be computed based on the standard (to meet a target average bit rate at the output of the encoder).

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

FIG. 1 is a block diagram illustrating the details of an example environment in which several aspects of the present invention may be implemented. The environment is shown containing video source 110 and device 100. Device 100 corresponds to a video encoding system, and is shown containing frame generation block 120, transform block 130, quantizer block 140, coding block 150, inverse quantizer 170, inverse transform 160, rate control Block 180 and buffer 190. Each block may be implemented with a desired hardware configuration supported by any necessary software/firmware, as suited for the specific situation.

Video source 110 generates a sequence of video frames representing respective scenes of interest. Each video frame is represented by a sequence of pixel values, logically organized as a rectangle (to correspond to the captured scene). The video frames may be provided in YCbCr format. As described below, device 100 operates to compress the video frames.

Frame generation block 120 generates a sequence of difference frames from the unprocessed video frames received from the video source 110. In general, a reference frame received on path 172 is compared with the corresponding unprocessed frame to generate a difference frame. When the differences are minimal or when processing a first frame, the unprocessed frame itself may be forwarded as the difference frame, with appropriate encoding information added.

Each frame is viewed as containing several macro-blocks, to facilitate generation of the difference frames. A macroblock may be defined as a two-dimensional array representing a part of a frame. For example, it may be defined as an array of 16×16 pixels in a frame in case of MPEG/H.264 related standard.

Transform block 130 is used to convert the difference frames received from frame generation block 120 into a form suitable for compression. For example, if the video encoder conforms to the MPEG-4 standard, the transform block applies a Discrete Cosine Transform (DCT) on the incoming frame. In the case of H.264 standard, the transform block applies an Integer Transform on the incoming frame. The outputs of transform block 130 are often referred to as transform coefficients or just 'coefficients'.

Quantizer block 140 quantizes the coefficients generated by transform block 130 based on the quantization parameter (QP) received on path 184. As is well known, the quantization restricts the entire range of possible values of magnitude of the transform coefficients to a small set of discrete levels. A QP value is received for each frame and the coefficients of the frame are quantized by the corresponding value/degree. In an embodiment, quantization is performed by dividing each of the coefficients by the QP value received for the video/difference frame.

Inverse quantizer 170 and inverse transform 160 are used to perform the inverse operations of the quantizer and transform blocks respectively, and thus together operate to recover the source video frame (similar to how the decoder would, based on the encoded data). The output of the inverse quantizer represents the quantized transform coefficients. The inverse transform block may then be used to retrieve the original video frame. Such a recovered or reconstructed frame (for a preceding frame) can be used as a reference frame (for the present frame) by components in frame generation block 120. As may be appreciated, the term present frame refers to the same frame during the processing in various blocks.

Coding block 150 allocates codewords to symbols representing the quantized transform coefficients. The coding block is also referred to as entropy coding block or variable length coding block. The coding block may allocate codewords based on the frequency of occurrence of symbols in the input data. For example, in variable length encoding, symbols occurring frequently are allocated codewords that require fewer bits for their representation, and symbols occurring less often are allocated codewords that require more bits for their representation. The output of the coding block, including other information (e.g., QP, time stamps, the sequence in which macroblocks are selected in the frame) required for decoding, represents the encoded video bit stream.

Buffer 190 stores the encoded video bit stream prior to transmission on path 199. Alternatively, the bit stream may be stored on a secondary storage for later use. When transmitted, path 199 may have an associated maximum bandwidth that can be used to transmit the encoded bit stream. For example, assuming path 199 represents a dedicated transmission link, the entire bandwidth of the link may be available for transmitting the encoded sequence of bits. In general, buffer 190 is used to smooth out variations in bit rates.

Rate control block 180 provides QP value on path 184, to cause average bit rate of the output video bit stream to be restricted to a desired value ("target average"), while attempting to ensure adequate quality in ability to reproduce the source video frame from the encoded data. Average bit rate for a specific duration of time is defined as the number of bits in the output in the duration, divided by the number of seconds in the duration. The number of seconds may be determined based on the Group of Picture (GOP) length and in one embodiment is between 2.5 to 5 seconds in case of video telephony.

In general, a target average is received on path 111 and rate control block 180 thereafter sets QP values for respective frames to ensure that the target average is not exceeded (assuming that the frame rate is fixed by the specific standard/environment). Thus, if prior frames have used fewer bits (based on information received from coding block 150 or by examining path 199, as shown) than those permitted by the target average, a lower value of QP may be provided (to permit more bits to be generated for the corresponding frame).

Similarly, a higher QP value may be provided in case the prior frames have used more bits than those permitted by the target average. In an extreme scenario, an encoder may skip frames to ensure that the target average is not exceeded, thereby leading to reduced video quality when the values are eventually decoded.

In general, it may be appreciated that suitable QP values are to be provided to ensure that as low quantization values as possible are used for each frame, and yet sufficient budget (permissible number of bits for encoded output) is available for following frames within the constraints imposed by the desired target average.

In one prior approach, the QP values are calculated with the aim to achieve the average bitrate while giving no special consideration to bits consumed by one frame. This necessarily allowed the number of bits for some frames to exceed the target average bits per frame, while the number of bits for some other frames is forced to be less than the target average bits per frame.

As an illustration, assuming a target average bit rate of A bits per second and a desired frame rate of F fps (frames per second), the target average bits per frame would equal A/F. Assuming A equals 768 Kbps and F equals 30 frames per second, the target average may be computed to be equal (768/30=25.6). Thus, setting of QP by prior approach could cause some frames to have more than 26 k bits, while some other frames would have less than 26 k bits.

Such encoding approaches may degrade video quality at least in some instances. For example, when an earlier frame uses an excessive number of bits, the bit budgets for later frames may be accordingly reduced. Due to such reduction, the later frames may either be quantized with higher values or, in a more extreme case, an entire later frame skipped. In either case, a reduced video quality with respect to the later frames would be perceptible.

Another problem is seen when the average bitrate of the encoded stream is close to the maximum bitrate supported by the decoder. In such case, a frame encoded with excessive number of bits takes more time to decode than what is permissible from fps requirement. This can cause the video playback to be non-smooth (resulting in stuttering).

An aspect of the present invention instead limits the number of bits for each encoded frame to an upper limit, thereby avoiding at least the problems noted above. In an embodiment, such a limit is met by controlling QP values for the respective video frames, as described below with examples.

3. Encoding with Upper Limit to Bit Budget for Each Frame

Figure 2:
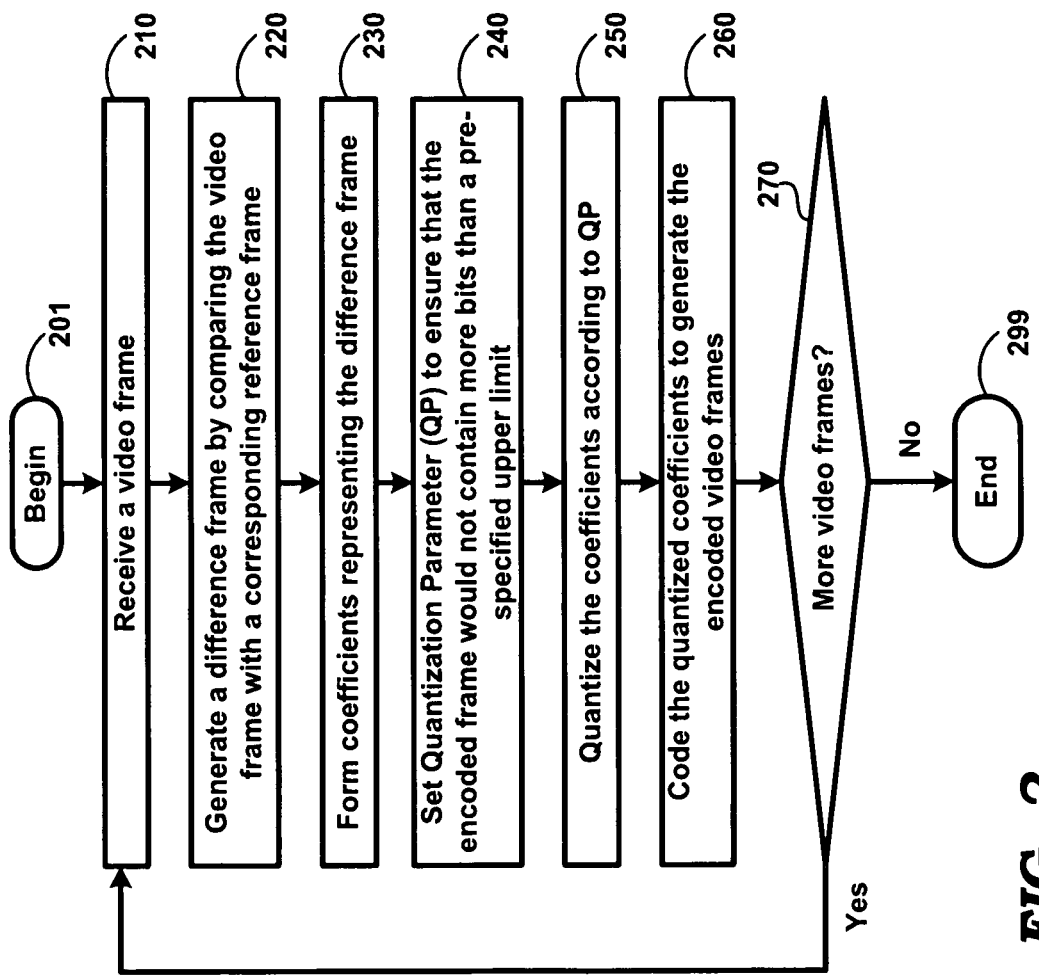
FIG. 2 is a flowchart illustrating the manner in which the size of each encoded frame is limited to an upper limit according to an aspect of the present invention.

FIG. 2 is a flowchart depicting the manner in which the size of each encoded frame is limited to an upper limit in an embodiment of the present invention. The flowchart is described below with reference to FIG. 1 merely for illustration. Alternative embodiments in other environments, for example, using different sequence of steps can also be implemented without departing from the scope and spirit of several aspects of the present invention, as will be apparent to one skilled in the relevant arts by reading the disclosure provided herein. The flow chart begins in step 201 and control passes to step 210.

In step 210, video encoding system 100 receives an input video frame from video source 110, for example, as described above. In step 220, video encoding system 100 generates a difference frame by comparing the incoming video frame with a corresponding reference frame. In step 230, video encoding system 100 forms a set of coefficients representing each difference frame. Steps 210, 220 and 230 may be performed, for example, as described above with respect to FIG. 1.

In step 240, video encoding system 100 sets the value of quantization parameter to ensure that the encoded frame does not contain more bits than an upper limit. The upper limit can be chosen based on various considerations, as suited in the corresponding environments. However, the upper limit is less than the bandwidth of path 199, since otherwise the size of buffer 190 may need to be very large.

In step 250, video encoding system 100 quantizes the transform coefficients according to the QP value. In step 260, video encoding system 100 codes the quantized coefficients to generate the encoded video frames. Steps 250 and 260 may also be performed as described above with respect to FIG. 1.

In step 270, video encoding system 100 checks if more frames are to be processed, and repeats steps 210 to 260 if there is a new frame to be encoded. If there are no more frames, then control passes to step 299. The flowchart ends in step 299.

It may thus be appreciated that the flowchart of FIG. 2 operates to set an upper limit on the number of bits used per frame and thus some of the problems noted above with respect to the prior embodiment may be avoided. In particular, more bit budget can be ensured for later frames by choosing a correspondingly lower value (which is greater than the target average bit rate) for the upper limit noted above. As a result, even for higher complexity frames or when the source frame itself is passed as a difference frame, the bit budget is sought to be minimized to stay within the upper limit for that frame.

However, substantially lower value would imply that the bit budget for the present frames could be lower and thus adversely impacting the higher quality video otherwise possible for the present frame. In an embodiment, the upper limit equals 3 times the target average bit rate.

It may be appreciated that an embodiment in accordance with FIG. 1 may require substantial computational power (e.g., by trial and error) to compute an acceptable QP value which ensures the upper limit of step 240, while providing as low a QP value possible for the corresponding present frame.

Thus, according to another aspect of the present invention, the computation of QP is simplified by considering the complexity of each video frame as well. Complexity is a measure of the number of bits that would be required to encode a frame for a same video quality. Thus, the complexity is said to be more, if the number of bits required is more. Complexity can be measured by examining the data representing the video frame at various phases (i.e., output of various blocks), as described below with examples.

4. Generating QP Considering Frame Complexity

Figure 3:
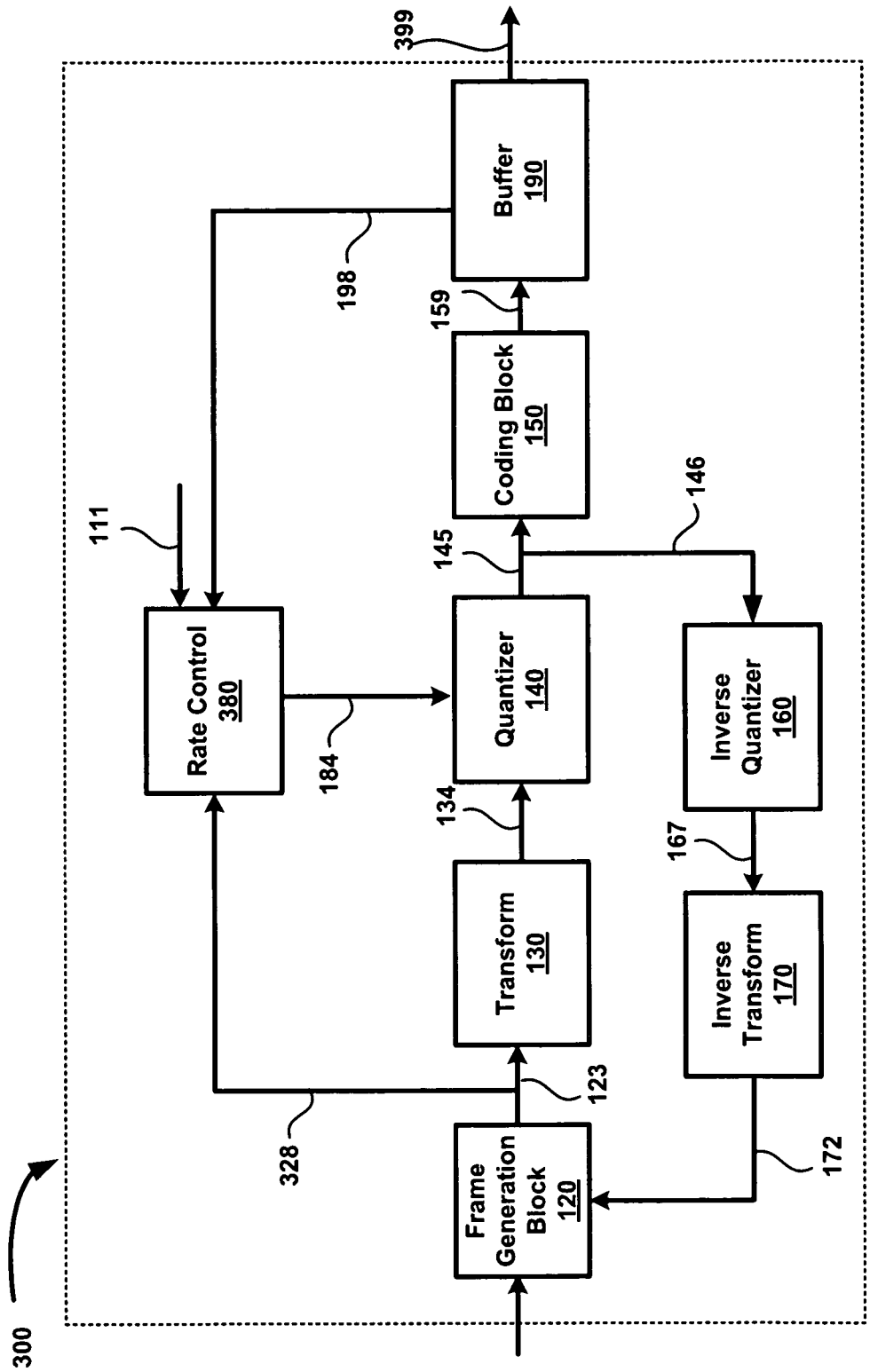
FIG. 3 is a block diagram illustrating the details of a video encoding system in one embodiment of the present invention.

FIG. 3 is a block diagram illustrating the details an example video encoder according to an aspect of the present invention. For conciseness, video encoder 300 is shown with the several of the blocks shown in FIG. 1, and the corresponding description is not repeated for conciseness. Rate control block 380 is shown replacing rate control block 180 (of FIG. 1), and the corresponding description is provided below.

Rate control block 380 sets the QP value for each video frame by considering the complexity of each video frame. The QP values thus generated are provided on path 184, for quantizer 140 to quantize the coefficients received from transform block 130.

In the embodiment of FIG. 3, rate control block 380 is shown examining the difference frame (or values representing the difference frame), though alternative embodiments can be implemented to examine other data representing the video frame for which QP is sought to be generated. The manner in which the complexity of each video frame can be measured is described below with examples.

5. Example Implementation

Figure 4:
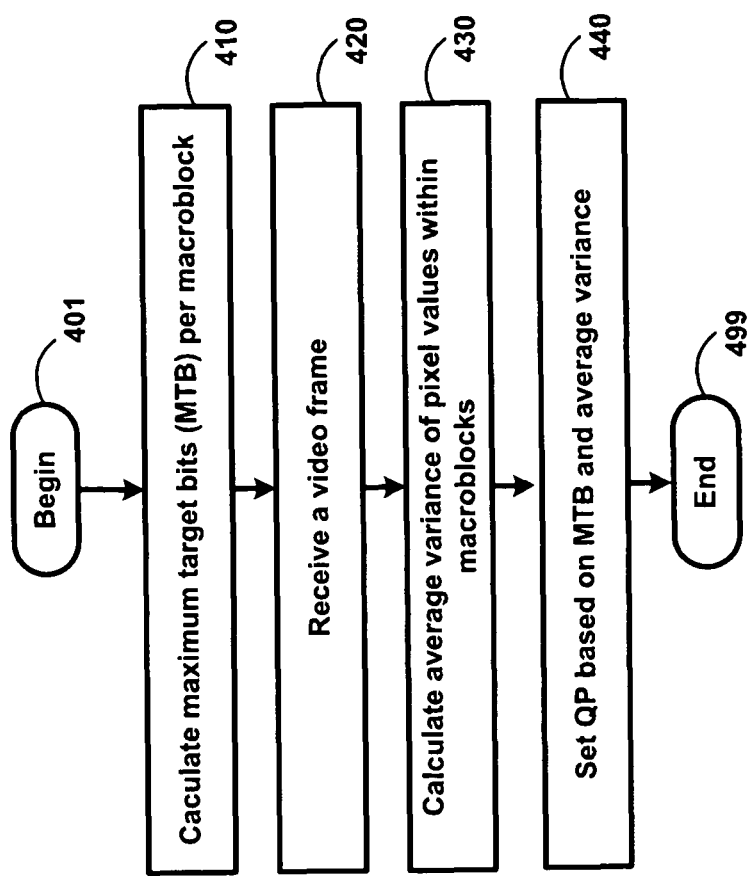
FIG. 4 is a flowchart illustrating the manner in which quantization parameter (QP) is set in one embodiment of the present invention.

FIG. 4 is a flowchart illustrating the manner in which QP is set based on complexity of a video frame in an embodiment of the present invention. The flowchart is described below with reference to FIGS. 1 and 3 merely for illustration. Alternative embodiments in other environments, using different sequence of steps can also be implemented without departing from the scope and spirit of several aspects of the present invention, as will be apparent to one skilled in the relevant arts by reading the disclosure provided herein. The flowchart begins in step 401 and control passes to step 410.

In step 410, rate control block 380 calculates the maximum target bits (MTB) per macroblock. This implies that the number of bits used for encoding the macroblock should not thereafter exceed the calculated limit. In an embodiment, MTB is set by dividing the upper limit of step 240 by the number of macroblocks in the video frame (which can be readily obtained from frame generation block 120, though the specific connection is not shown).

Thus, assuming that a target average bit rate, frame rate and number of macroblocks in the video frame are known, the MTB can be computed as follows:

MTB=N*Average Bit rate/(frame rate*number of macroblocks per frame), wherein N is a parameter equaling 3 (as described above).

The MTB thus computed is used in processing each video frame, as described below.

In step 420, rate control block 380 receives an input video frame for which QP is sought to be generated. The difference frame, representing the input video frame, is shown being received on path 328, though other data representing the video frame (before quantization) can be used in alternative embodiments.

In step 430, rate control block 380 calculates average of variances of pixel values within macroblocks. Variance is a measure of how much variation is there in the pixel value of the macroblock and is often referred to as energy in the macroblock. Variance within a macroblock may be computed by determining the average of the pixel values and summing the square of differences of the pixel values and the average value. The variance value may be computed for each macroblock and the average of variances may thereafter be computed for a present video frame.

The average of variances has been selected based on an observation that better correlation was observed between desired QP values and the average of variances of macroblocks, compared to variance of the entire frame. However, alternative embodiments can be implemented using other measures of complexity such as variance of the entire frame, without departing from the scope and spirit of several aspects of the present invention.

In step 440, rate control block 380 obtains QP based on MTB and average variance. In general, a higher value of MTB would imply a lower QP value (i.e., division by smaller value) and a higher value of average variance would imply a higher QP value. In an embodiment, multiple tables are formed, with each table corresponding to a single non-overlapping range of MTB values and within each table, rows are provided for corresponding non-overlapping ranges of the average variance. The tables may be populated based on experimental results, as will be apparent to a skilled practitioner.

Figure 5:
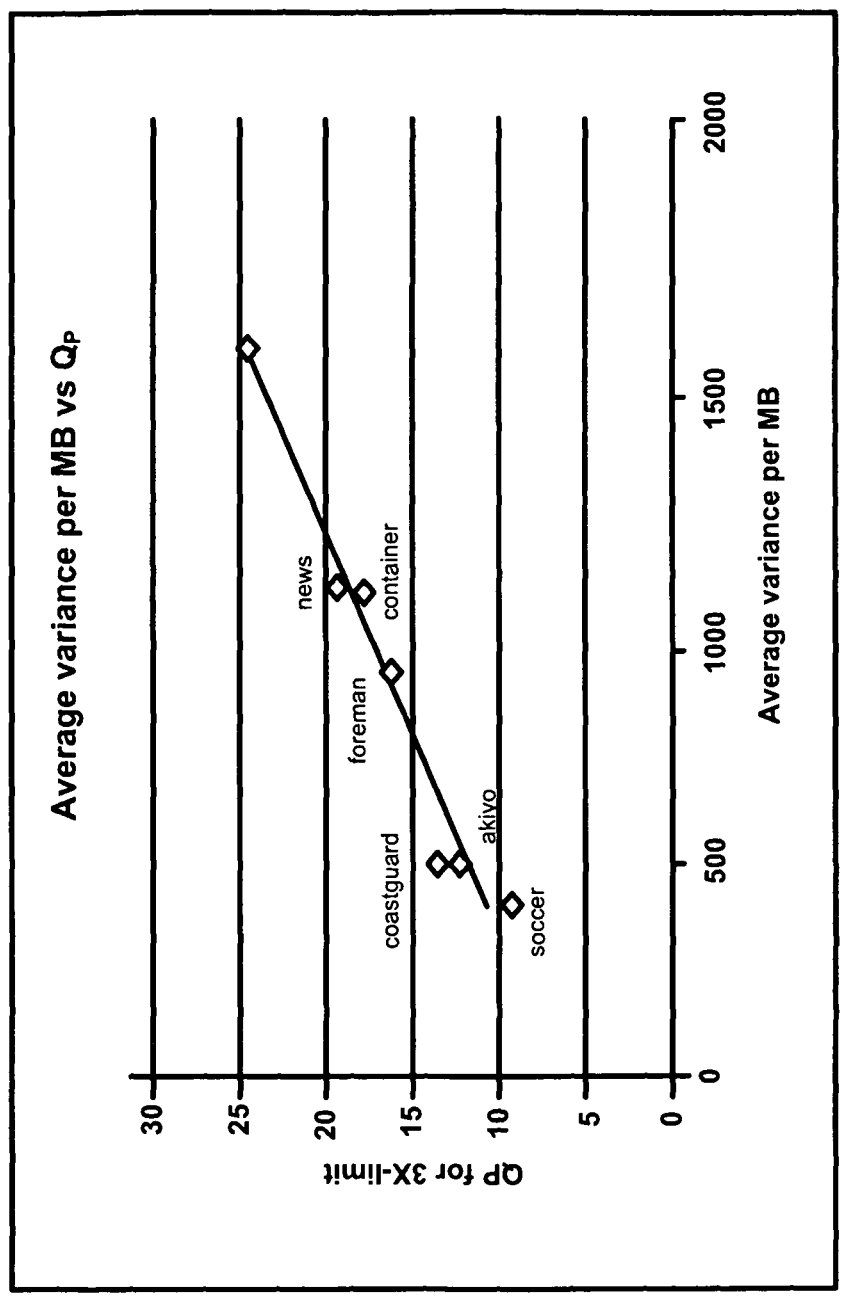
FIG. 5 is a graph illustrating the relationship between average of variances of macroblocks and the required QP value in an embodiment.

The table corresponding to each MTB is illustrated with a graph in FIG. 5. The graph shows average of variances of macroblocks on X-axis, and a corresponding QP value on the Y-axis. As shown there, different points there correspond to different video sequences (capturing respective scenes of interest). The point corresponding to News video sequence is shown to have most variance per macroblock, while the one corresponding to soccer is shown with the least variance per macroblock. QP is shown set to a value between 9 and 19, as shown there. The flowchart ends in step 499.

It may be appreciated that the complexity computation of above may require substantial computational power, and therefore undesirable at least in some environments. An alternative embodiment, which reduces such computational requirements, is described below in further detail.

6. Alternative Implementation

Figure 6:
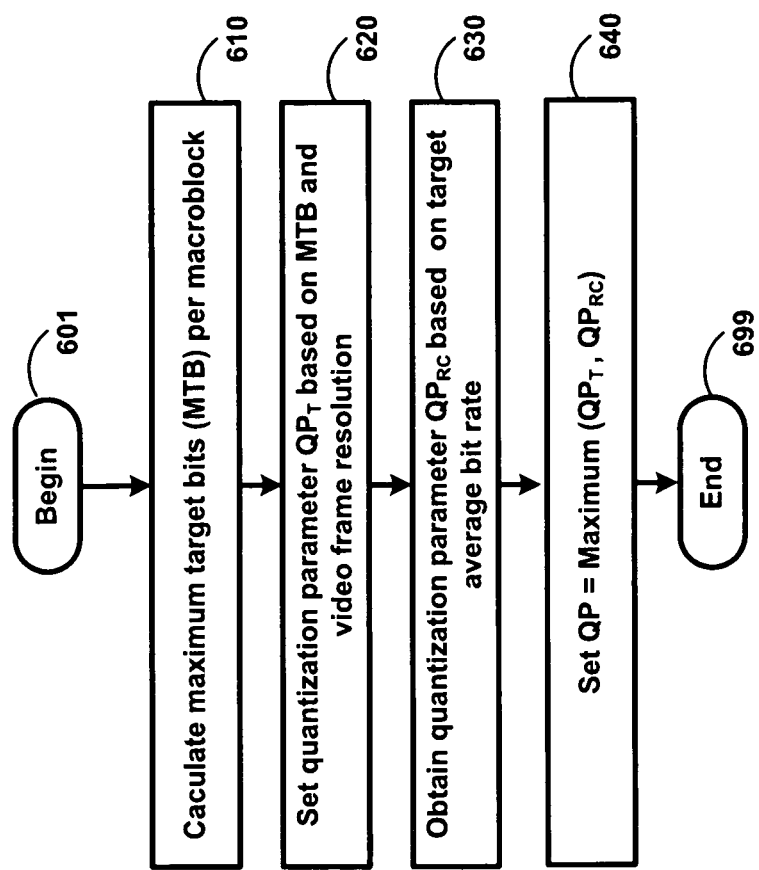
FIG. 6 is a flowchart illustrating the manner in which quantization parameter (QP) is set in an alternative embodiment of the present invention.

FIG. 6 is a flowchart illustrating the manner in which QP is set based on complexity of a video frame in an embodiment of the present invention. The flowchart is described below with reference to FIGS. 1 and 3 merely for illustration. The flowchart begins in step 601 and control passes to step 610.

In step 610, rate control block 380 calculates the MTB per macroblock, for example, as described above with respect to step 410 of FIG. 4.

In step 620, rate control block 380 sets quantization parameter $QP_T$ to a value based on MTB and video frame resolution.

In an embodiment, a table is constructed by experimentally encoding the video frames of different resolutions using different quantization levels to observe the bits/macroblock in the encoded frames. From the experiments, one can readily appreciate the approximate quantization parameter value that is suited for a given combination of MTB values and resolution. An example table thus constructed (in relation to MPEG 4 standard) is shown in FIG. 7.

FIG. 7 is shown with values for three ranges of resolution, less than QCIF (quarter CIF), between QCIF and CIF (common intermediate format), and greater than CIF, in one embodiment. As is well known in the relevant arts, video frames of Quarter Common Intermediate Format (QCIF) resolution would have (176×144) pixels.

In general, the QP value reduces inversely proportionate to resolution of the video frame. However, as the same sequence of video frames are not used for the three columns of FIG. 7, such a relationship is not demonstrated there. The values of FIG. 7 have thus been determined experimentally for example video sequences.

Thus, depending on the appropriate resolution, the values in the corresponding column may be examined to determine a matching MTB value and a QP in the same row is determined to be $QP_T$.

Continuing with reference to FIGS. 3 and 6, in step 630, rate control block 380 obtains a QP value $QP_{RC}$ based on the target average bit rate alone (i.e., without using the multiplication factor noted above with respect to step 240). In an embodiment, $QP_{RC}$ is computed according to the respective encoding standard (e.g., H.264).

In step 640, rate control block 380 sets the value of QP to be equal to the maximum of $QP_T$ and $QP_{RC}$ values. The value thus set is provided to quantize the video frame of step 210/610. It should be appreciated that the upper limit of step 240 is maintained due to the selection of a value not less than MTB computed in step 610 above. The flowchart ends in step 699.

Thus, using the approaches such as those described above, QP value can be used to meet the upper limit noted in step 240. For illustration, the results in comparison with a prior embodiment are described briefly below.

7. Results

Figure 8A:
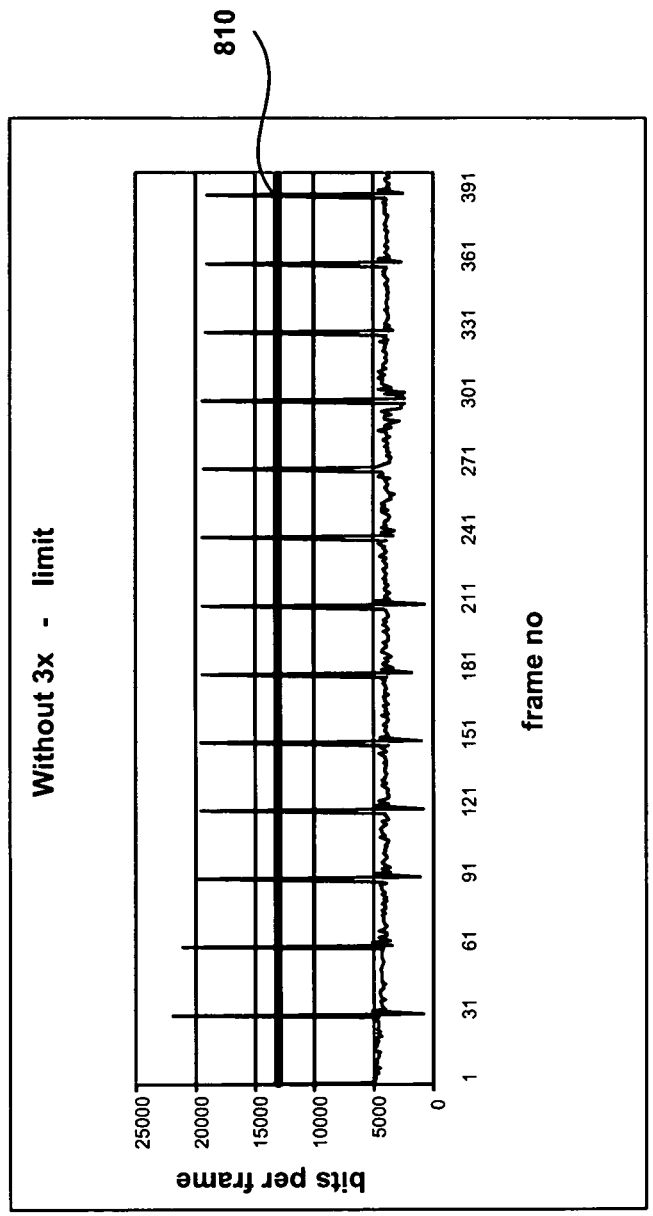
FIG. 8A is a graph illustrating the bits per frame (and thus selection of QP) for a sequence of video frames in a prior approach.
Figure 8B:
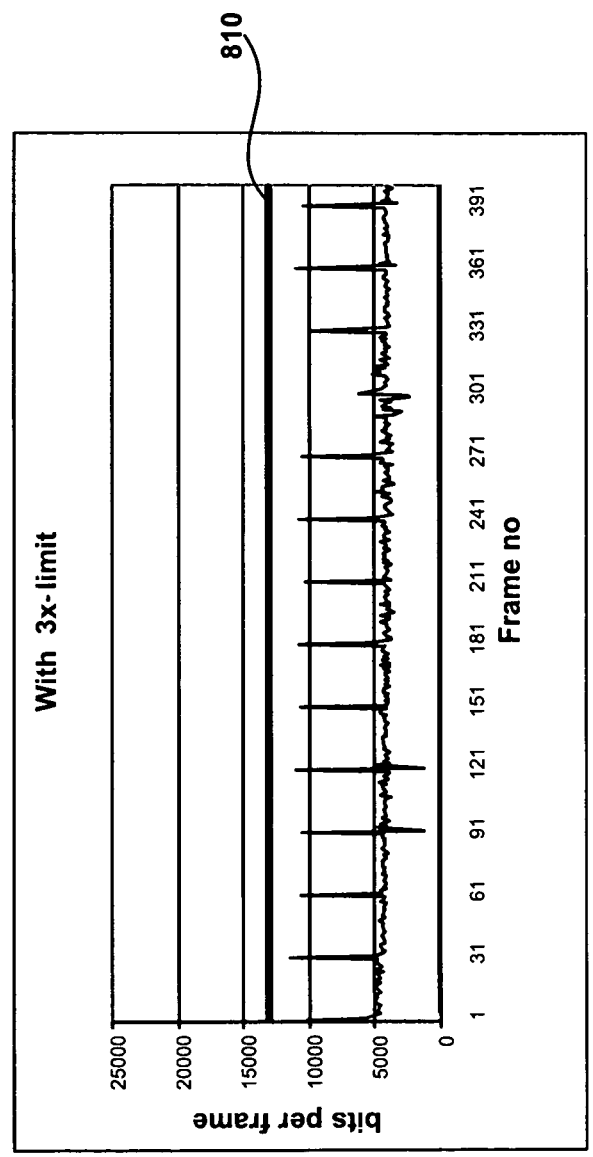
FIG. 8B is a graph illustrating the bits per frame for a sequence of video frames in an embodiment of the present invention.

FIGS. 8A and 8B are graphs depicting the number of bits used according to a prior approach and in an embodiment of the present invention. Each of the graphs depicts the frame number (in a sequence of video frames) on X-axis and the number of bits on path 199 on Y-axis. In the Figures, 810 represents the upper limit of step 240 (assuming it is 3 times the target average bit rate)

As may be observed from FIG. 8A, the number of bits used for encoding video frames exceeds limit 810 in several instances. In contrast, in FIG. 8B, the number of bits used is shown to be less than limit 810 due to various features of the present invention described above.

From the above descriptions of the present invention and the results, it may be appreciated that the present invention leads to a bound on the instantaneous bit rate of the output of the video encoder. The resulting output video bit stream can give smooth playback of video at the decoder.

The problems avoided by such an approach may be appreciated considering a video sequence encoded at an average bit rate of 300 kbps, 30 fps and transmitted over a link of 1 Mbps. The average size of a frame is 10 k bits. This frame will get transmitted over the link in 1/100 sec (=10 kb/1 Mbps). Now consider a frame which gets encoded at 10 times the avg. size (100 kbits). The link can transmit ~33 kbits (=1000/30) in 1/30 sec. Thus, this frame will take approximately 1/10 second to get transmitted instead of required 1/30 sec. This will cause the frame to reach at a delayed time at the other end of the link. Such a delay can be avoided if we limit the encoded frame size as described above.

It should be further appreciated that the above-described features of video encoding system 100 may be implemented in a combination of one or more of hardware, software, and firmware (though the below embodiment is described as being implemented in the form of software instructions). The description is continued with respect to an embodiment in which various features are operative by execution of corresponding software instructions.

8. Digital Processing System

Figure 9:
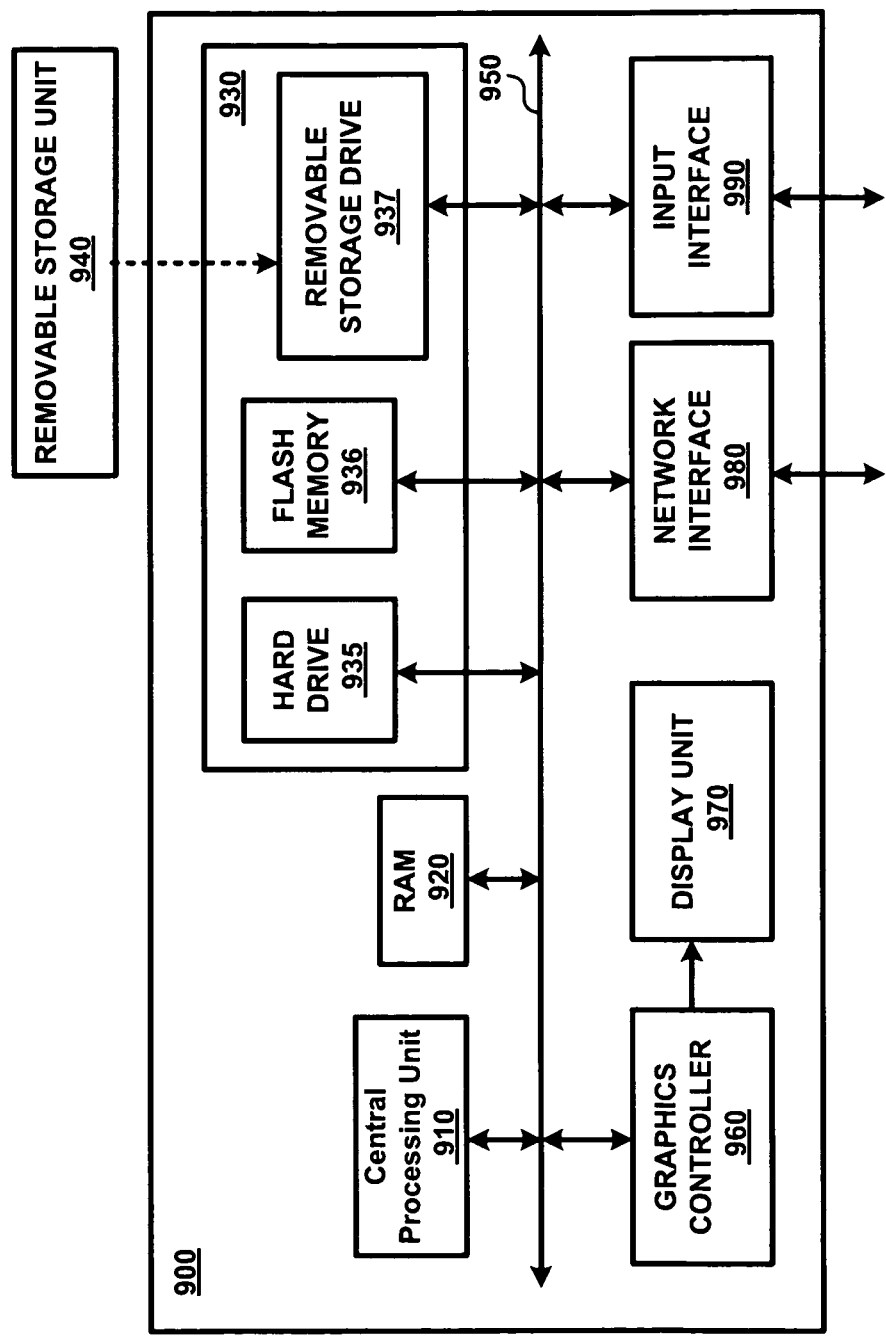
FIG. 9 is a block diagram illustrating the details of a digital processing system in which several features of the present invention are operative upon execution of appropriate software instructions in one embodiment.

FIG. 9 is a block diagram illustrating the details of digital processing system 900 in which various aspects of the present invention are operative by execution of appropriate software instructions in one embodiment. Digital processing system 900 may correspond to video encoding system 100/300 of FIGS. 1 and 3.

System 900 may contain one or more processors a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention (including encoding of video frames and potentially causing transmission of the same via network interface 980). CPU 910 may contain multiple processing units, with each processing unit potentially being designed for a specific task. Alternatively, CPU 910 may contain only a single general purpose processing unit. RAM 920 may receive instructions from secondary memory 930 using communication path 950.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse). Network interface 980 provides connectivity to a network (e.g., using Internet Protocol), and may be used to transmit encoded frames to a decoding system (not shown). Alternatively, the encoded frames may be stored on removable storage driver 937 for later use.

Secondary memory 930 may contain hard drive 935, flash memory 936 and removable storage drive 937. Secondary memory 930 may store the data (e.g., the source video frames, the encoded data, various parameters used to convert to the encoded data according to the features described above, etc.) and software instructions, which enable system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of processing video frames in an encoding system, said method comprising:

receiving a sequence of video frames, wherein each of said sequence of frames comprises a corresponding sequence of pixel values; and encoding each of said sequence of frames according to limiting a number of bits of each encoded frame to a pre-specified upper limit for each encoded frame, wherein each of said sequence of frames is encoded using a respective quantization parameter based on said pre-specified upper limit;

receiving an average bit rate, wherein said average bit rate represents an average number of bits per unit time formed by said encoding in a duration, wherein said pre-specified upper limit is computed based on said average bit rate, wherein said encoding comprises:

generating a sequence of difference frames by comparing each of said sequence of video frames with a corresponding reference frame;

applying a transform on each of said sequence of difference frames to generate a corresponding set of coefficients;

determining a quantization parameter for each of said sequence of frames based on said pre-specified upper limit, wherein said determining comprises:

examining each video frame to determine a corresponding complexity, wherein a number of bits required to represent the video frame for a same quality is proportionate to said complexity, wherein said examining comprises calculating an average of variances of macroblocks contained in each present frame, wherein a maximum target bits (MTB) per macroblock is calculated in the present frame, and wherein said MTB and said average of variances are used to set said quantization parameter for the present frame; and setting said quantization parameter for each frame to have a positive correlation with said complexity, wherein said quantization parameter is determined based on said upper limit;

quantizing said set of coefficients according to said quantization parameter to generate a set of quantized coefficients; and coding said set of quantized coefficients to form a set of code words, which together represents the set of pixel values for the corresponding video frame; and maintaining a plurality of tables, one for each of non-overlapping ranges of MTB values, wherein each table indicates a corresponding quantization parameter for said average of variances, wherein said using includes performing a lookup of said plurality of tables.

2. The method of claim 1, wherein said pre-specified upper limit equals a factor times said average, wherein said factor is greater than 1.

3. The method of claim 2, wherein said factor is less than 3.

4. The method claim 1, wherein said examining checks a resolution of a present frame, wherein said method further comprises:

computing a MTB per macroblock in the present frame;

using said MTB and said resolution to form a first potential value for said quantization parameter for the present frame;

obtaining a second potential value for said quantization parameter for the present frame based on an approach; and setting said quantization parameter to equal the larger one of said first potential value and said second potential value.

5. The method of claim 4, wherein said approach is according to a standard, using which said encoding is performed.

6. A machine readable storage medium storing one or more sequences of instructions for causing a video encoding system to process video frames, wherein execution of said one or more sequences of instructions by one or more processors contained in said system causes said system to perform the actions of:

forming a sequence of difference frames representing a sequence of video frames;

transforming said sequence of difference frames to a corresponding sequence of sets of coefficients, each set corresponding to a difference frame;

quantizing each of said sequence of sets of coefficients using a corresponding one of a sequence of quantization parameters to form a sequence of sets of quantized coefficients;

coding said sequence of sets of quantized coefficients to form a sequence of encoded frames representing said sequence of video frames;

generating a sequence of quantization parameters, each for a corresponding difference frame, wherein each quantization parameter is set to limit the size of each of said encoded frames to an upper limit, wherein said generating comprises:

examining each video frame to determine a corresponding complexity, wherein a number of bits required to represent the video frame for a same quality is proportionate to said complexity, wherein said examining comprises calculating an average of variances of macroblocks contained in each present frame; and setting said quantization parameter for each frame to have a positive correlation with said complexity, wherein said quantization parameter is determined based on said upper limit;

receiving an average bit rate, wherein said average bit rate represents an average number of bits per unit time formed by said encoding in a duration, wherein said pre-specified upper limit is computed based on said average bit rate;

computing a maximum target bits (MTB) per macroblock in the present frame;

maintaining a plurality of tables, one for each of non-overlapping ranges of MTB values, wherein each table indicates a corresponding quantization parameter for said average of variances; and using said MTB and said average of variances to set said quantization parameter for the present frame, wherein said using comprises performing a lookup of said plurality of tables.

7. The machine readable storage medium of claim 6, wherein said examining checks a resolution of a present frame, wherein said method further comprises one or more instructions for:

computing a maximum target bits (MTB) per macroblock in the present frame;

using said MTB and said resolution to form a first potential value for said quantization parameter for the present frame;

obtaining a second potential value for said quantization parameter for the present frame based on an approach; and setting said quantization parameter to equal the larger one of said first potential value and said second potential value.

* * * * *